(12) United States Patent
Malone

(10) Patent No.: US 12,710,043 B1
(45) Date of Patent: Aug. 18, 2026

(54) FLOW CHANNEL FOR AN INTEGRATED PUMP WITH ROTARY VALVE

(71) Applicant: Cooper-Standard Automotive Inc., Northville, MI (US)

(72) Inventor: David S. Malone, Attica, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 0 days.

(21) Appl. No.: 19/223,638

(22) Filed: May 30, 2025

(51) Int. Cl.

| | |
|---|---|
| ***F04D 1/00*** | (2006.01) |
| ***F04D 15/00*** | (2006.01) |
| ***F04D 29/46*** | (2006.01) |
| ***F16K 3/26*** | (2006.01) |

(52) U.S. Cl.
CPC ........... *F04D 1/00* (2013.01); *F04D 15/0005* (2013.01); *F04D 15/0022* (2013.01); *F04D 29/466* (2013.01); *F16K 3/26* (2013.01); *F05D 2210/11* (2013.01)

(58) Field of Classification Search
CPC .... F04D 1/00; F04D 15/0005; F04D 15/0016; F04D 15/0022; F04D 27/002; F04D 27/005; F04D 29/4293; F04D 29/466; F04D 29/468; F16K 3/26
See application file for complete search history.

(56) References Cited

U.S. PATENT DOCUMENTS

| | | | | |
|---|---|---|---|---|
| 4,679,983 | A * | 7/1987 | Pietryk | F04D 29/486 415/152.2 |
| 4,869,076 | A * | 9/1989 | Sakai | F04D 29/486 62/347 |
| 9,890,686 | B2 | 2/2018 | Klippert et al. | |
| 10,563,780 | B2 | 2/2020 | Leroyer et al. | |
| 11,982,279 | B2 * | 5/2024 | Malone | F04D 29/026 |
| 12,092,115 | B2 * | 9/2024 | Malone | H02K 11/33 |
| 12,297,843 | B2 * | 5/2025 | Malone | F04D 15/0022 |
| 2024/0068481 | A1 * | 2/2024 | Malone | F04B 49/22 |

* cited by examiner

*Primary Examiner* — Christopher R Legendre
(74) *Attorney, Agent, or Firm* — Paschall & Associates, LLC; James C. Paschall; Anthony Miologos

(57) ABSTRACT

A fluid pump includes a housing having a fluid inlet and a first fluid outlet. A cavity located in the pump housing receives the fluid from the fluid inlet. A first flow channel fluidically connects the cavity to the first fluid outlet. An impeller positioned in the cavity moves the fluid from the cavity at a first rate of fluid flow. A valve mounted between the impeller and the first flow channel is positionable to direct the fluid from the cavity at the first rate of fluid flow to enter the first fluid channel and exit the first fluid outlet at a second rate of fluid flow.

17 Claims, 7 Drawing Sheets

FLOW CHANNEL FOR AN INTEGRATED PUMP WITH ROTARY VALVE

TECHNICAL FIELD

This disclosure is generally directed to pumps. More specifically, it relates to a fluid pump having an integrated rotary valve and a flow channel that produces a distributed rate of fluid flow.

BACKGROUND

Pumps are known and commonly used to move fluids, such as coolant in a vehicle. One example is cooling systems with water pumps, which are used for the cooling of different electrical components of the vehicle. These are hybrid or purely electric vehicles since vehicles with internal combustion engines do not comprise any electrical components that need to be cooled. Valves are used to ensure the distribution of the coolant throughout the cooling system. In hybrid and electric vehicles, the cooling circuits of such vehicles may require fluid rates of flow less than what the pump and valve typically provide when operating. The valves used with such pumps are limited in providing measured rates of flow over the travel of the valve when the valve switches the flow from or to one or more pump outlet ports.

Therefore, it is an object of the present disclosure to provide a fluid pump with an integrated valve that can provide distributed rates of fluid flow.

SUMMARY

In a first embodiment a fluid pump is disclosed arranged to produce a distributed rate of fluid flow from the pump. The fluid pump comprises a housing having a fluid inlet and at least a first fluid outlet. A cavity located in the pump housing receives the fluid from the fluid inlet. At least a first flow channel fluidically connects the cavity to the first fluid outlet. An impeller positioned in the cavity moves the fluid from the cavity at a first rate of fluid flow. A valve mounted between the impeller and the first flow channel is positionable to direct the fluid from the cavity at the first rate of fluid flow to enter the first fluid channel and exit the first fluid outlet at a second rate of fluid flow.

In a second embodiment a method is disclosed for producing a distributed rate of fluid flow from a fluid pump that includes a fluid inlet and at least a first fluid outlet. The method comprises receiving a fluid into a cavity contained in the pump from the fluid inlet and providing at least one flow channel fluidically connecting the cavity to the first fluid outlet. The method further comprises pumping the fluid from the cavity at a first rate of fluid flow and selectively directing the fluid from the cavity into the first flow channel to exit the first fluid outlet at a second rate of fluid flow.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

An example integrated pump assembly comprises a pump including a housing having an inlet, at least one outlet and an impeller for moving a fluid from the inlet to the outlet. A pump motor drives the impeller to move the fluid, and a rotary valve between the impeller and the outlet selectively controls the flow of fluid through the outlet.

Figure 1:
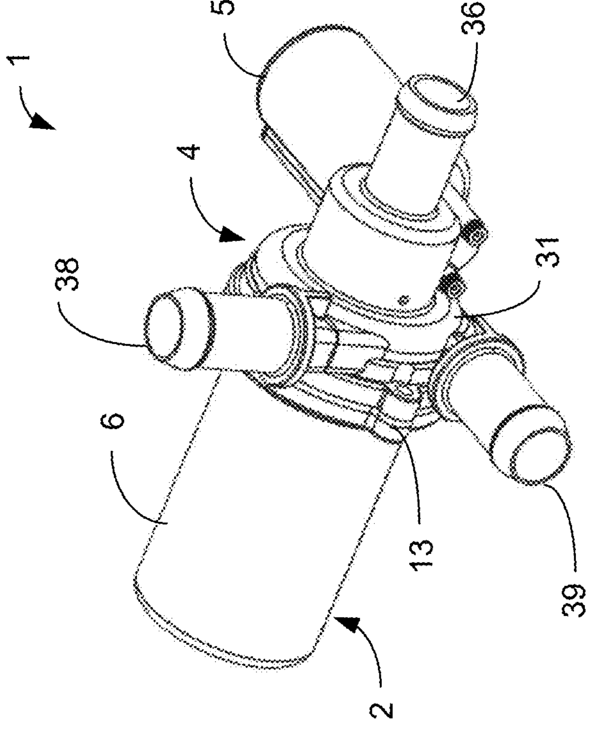
FIG. 1 illustrates a perspective view of an assembled integrated pump and valve.
Figure 2:
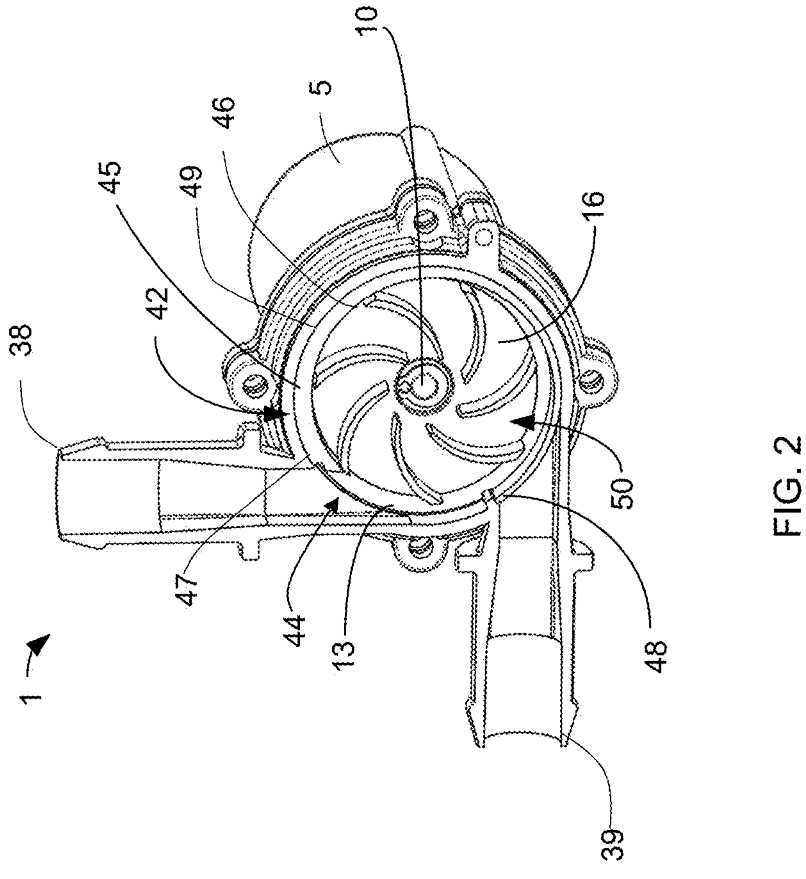
FIG. 2 illustrates a cross-sectional perspective view of a portion of the integrated pump and valve of FIG. 1.

FIGS. 1 and 2 illustrate the example integrated pump assembly 1 for pumping a fluid, such as a coolant, in a vehicle. As can be appreciated, the pump assembly 1 may also be used in non-vehicle applications. The pump assembly 1 includes a pump motor section 2 and a pump section 4. The pump motor section 2 includes a motor housing 6 that houses a pump motor therein and a motor shaft 10 installed through an opening of a pump motor mounting plate 13 to the pump section 4. An impeller 16 is housed in the pump section 4 and includes an impeller 16 having a plurality of impeller vanes. The impeller 16 is configured to be rotatable within the pump section 4 driven by the motor shaft 12 when the pump motor is energized.

A cylindrical pump housing 31 comprises the pump section 4. A fluid inlet 36, for example a suction inlet for sucking in a fluid, in this example a coolant, is positioned centrally to the rotary axis of the pump housing 31. The pump housing 31 also includes at least one fluid outlet for discharging fluid from the pump section 4. In this embodiment, two fluid outlets 38 and 39 are shown. A first fluid outlet 38, and a second fluid outlet 39 extend from pump housing 31 axially offset from the other such that the centers of the fluid outlets 38 and 39, are oriented 90 degrees from the other. It will be appreciated by those skilled in the art that fluid outlets 38 and 39 may be offset from each other at any other convenient angle. The fluid outlets 38 and 39 are fluidly connected to a pump cavity 50 contained in the pump housing 31.

As best seen in FIG. 2 an adjustable rotary valve member 42 is placed radially outside the impeller 16 and inside pump cavity 50. The valve member 42 is arranged to adjustably direct the fluid through the respective fluid outlets 38 and 39. The valve member 42 is comprised of a valve element 45 an exterior wall surface 49 and an interior wall surface 46 and an opening 44 extending through valve element 45. In this example, valve element 45 is spirally voluted from a generally thicker wall section at a first end 47 of opening 44 to a generally thinner wall section at a second end 48 of the opening 44. The impeller 16 is arranged to rotate inside the valve element 45 and the voluted interior wall surface 46.

An actuator, such as for example, an electrical actuator motor may be housed within an actuator housing 5 of the pump section 4. The actuator housing 5 is integrally formed with the pump housing 31, such as by injection molding. The actuator motor includes any convenient method for mechanically connecting to and driving the valve member 42. In operation, rotation of the valve member 42 by the actuator motor selectively positions opening 44 to divert fluid flow from the pump cavity 50 to the first or the second fluid outlets 38, 39 or to both fluid outlets 38, 39 at the same time and thereby controlling the discharge of fluid from the pump section 4.

Figure 3C:
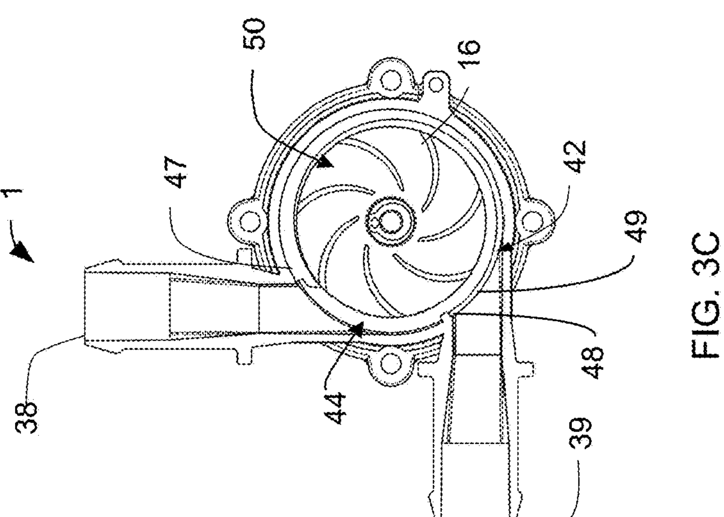
FIGS. 3A, 3B and 3C illustrate a cross-sectional view of a portion of the integrated pump and valve, with the valve in three operational positions.
Figure 3B:
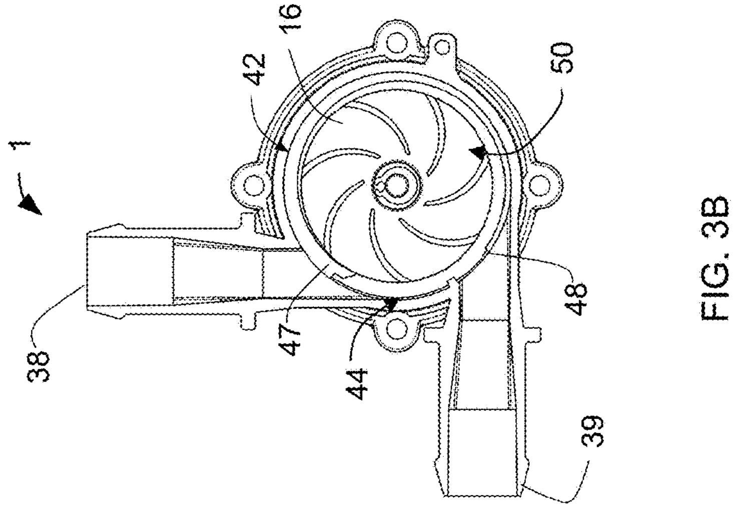
Figure 3A:
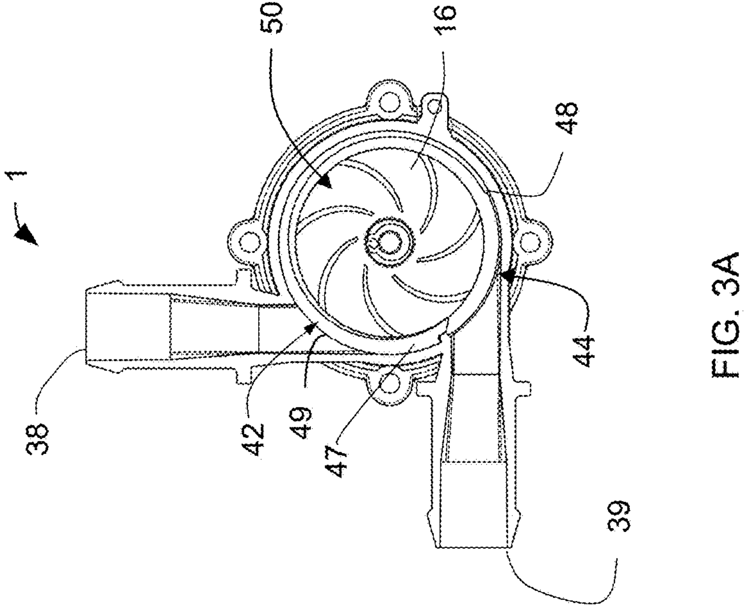

With reference to FIGS. 3A-3C, the operation of the valve member 42 will now be explained. As is shown, the pump cavity 50 of the pump housing 31 includes impeller 16 rotating within valve member 42 driven by pump motor shaft 10. The impeller 16 drives the fluid introduced into the pump cavity 50 from pump inlet 36. In FIG. 3A the actuator is energized to rotate the valve member 42 to position the opening 44 into a first position that is in alignment with the second fluid outlet 39. In the first position fluid driven by the impeller 16 is switched entirely through the first fluid outlet 39. Exterior wall surface 49 closing off and obstructing flow of the fluid to first fluid outlet 38.

In FIG. 3B the actuator is energized to rotate the valve member 42 to place opening 44 in a second position located between the first fluid outlet 38 and the second fluid outlet 39, causing the fluid driven by the impeller 16 to be discharged from both fluid outlets 38 and 39. FIG. 3B shows the opening 44 in a location where fluid flow is shared between fluid outlets 38, 39. That is, in the second position, opening 44 causes approximately 40% of the fluid volume driven by impeller 16 to be output through first fluid outlet 38 and approximately 60% of the fluid volume through the second fluid outlet 39.

In FIG. 3B, the actuator is energized again to rotate the valve member 42 to a third position that aligns opening 44 with the first fluid outlet 38. In the second position fluid driven by impeller 16 is directed entirely through the first fluid outlet 38. Wall surface 49 closing off and obstructing flow of the fluid to the second fluid outlet 39.

The percentage of flow from each fluid outlet 38, 39 of the pump and valve as function of the rotation of valve member 42 is shown in Table 1 below. The actuator rotates valve member 42 in approximately 15-degree angular segments.

TABLE 1

| Angle | Fluid From Outlet 39 (%) | Fluid From Outlet 38 (%) |
|---|---|---|
| 0.0 | 100.0 | 0.0 |
| 15.0 | 60.0 | 40.0 |
| 30.0 | 0.0 | 100.0 |

When valve member 42 is positioned into the first position, opening 44 is in alignment with the second fluid outlet 39 and exterior wall surface 49 closes off first fluid outlet 38. As shown in Table 1, 100% of the fluid in pump cavity 50 exits from fluid outlet 39, with zero fluid flow from fluid outlet 38. That is, all of the fluid that enters pump cavity 50 from the fluid inlet 36 is accelerated by the impeller 16 and switched by valve member 42 to exit fluid outlet 39. As the valve member 42 is rotated clockwise by the actuator to the second position, the opening 44 is placed at a location between the first fluid outlet 38 and the second fluid outlet 39, causing the fluid in pump cavity 50 to be discharged from both fluid outlets 38 and 39. As shown in Table 1, a 15 degrees of clockwise rotation of the valve member 42, causes 60% of the fluid in pump cavity 50 to flow from fluid outlet 39 while 40% flows from fluid outlet 38. A further 15-degree clockwise rotation of the valve member 42, aligns opening 44 with the first fluid outlet 38 and into the third position switching 100% of the fluid in pump cavity 50 to flow from fluid outlet 38 and the second fluid outlet 39 to be closed.

As can be appreciated, the rotary valve member 42 operation of the exemplary integrated pump assembly 1 operates as primarily as a switched flow control device. The opening 44 and the exterior wall surface 49 operating to open and close fluid outlets 38, 39 within a 30-degree angular rotation of the valve member 42. Additionally, a fixed second position at approximately 15-17 degrees of rotation (based on the rotational resolution of the actuator) positions the opening 44 and the exterior wall surface 49, to split the flow of fluid from the pump cavity 50 to both fluid outlets 38 and 39.

Figure 4:
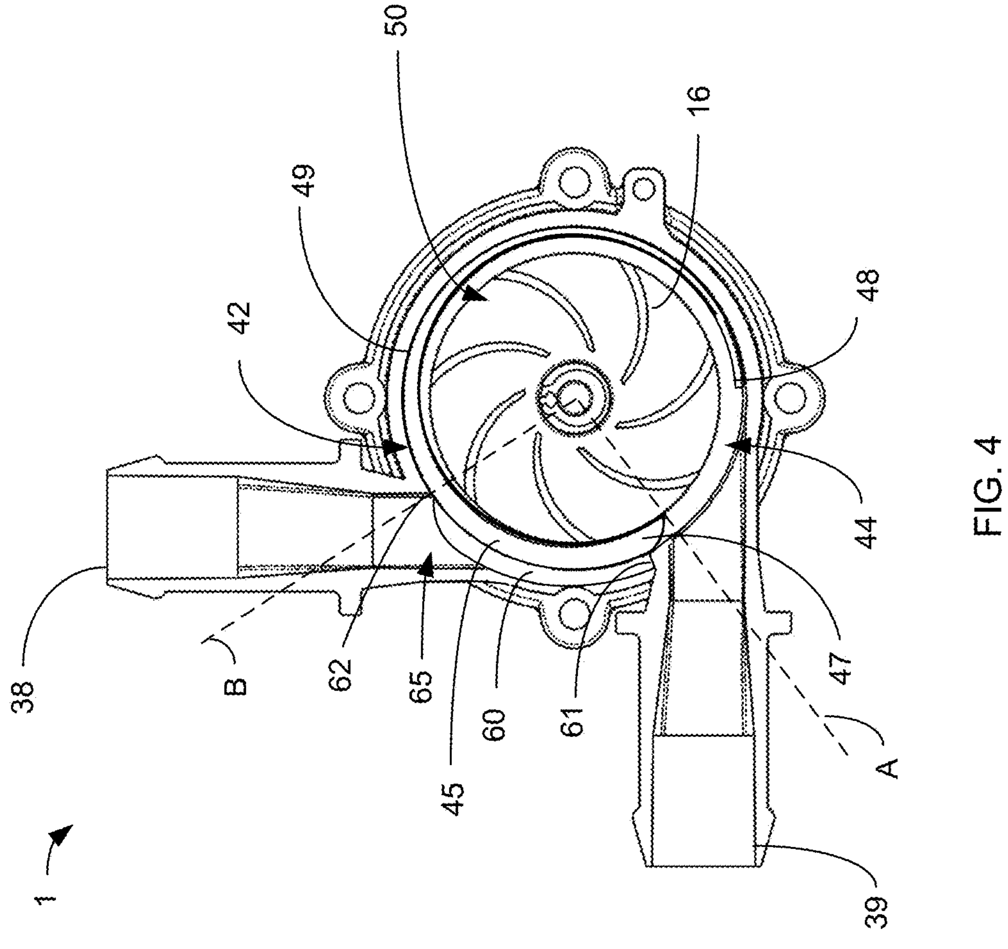
FIG. 4 illustrates a cross-sectional view of a portion of the integrated pump and valve, with a flow channel associated with a fluid outlet in accordance with present disclosure.

FIG. 4 illustrates the integrated pump and valve 1 of FIG. 2 including a flow channel 60 in accordance to an embodiment of the disclosure. The flow channel 60 is molded into the pump housing 31 between an inner wall of the pump housing and exterior wall surface 49 of the valve member 42. The flow channel 60 extends from an end wall 61 and into the entry 65 of fluid outlet 38. The flow channel 60 allows a greater distribution of fluid flow rates from fluid outlet 38 for an approximately 90-degree rotation of the valve member 42, from line A to line B. At line A the fluid in pump cavity 50 is closed from entering flow channel 60 due to first end 47 of opening 44 seated against end wall 61. Rotation of the valve member 42 clockwise by the actuator unseats first end 47 from end wall 61 to allow fluid into flow channel 60. A full 90-degree rotation of the valve member 42 by the actuator places first end 47 at point 62 of line B, aligning opening 44 with flow channel 60 where 100% of the fluid in pump cavity 50 enters the channel 60 and subsequently out of fluid outlet 38. In the example of FIG. 4, when the first end 47 of opening 44 reaches point 62 fluid the second end 48 of opening 44 traverses beyond end wall 61 placing exterior surface 49 of valve member 42 over the entry of fluid outlet 39 blocking fluid flow from entering fluid outlet 39.

When the valve member is rotated clockwise by the actuator, fluid in the pump cavity 50 flows into flow channel 60 over the exterior wall surface 49 to the entry 65 of fluid outlet 38. Flow channel 60 provides a less tortured path for fluid to flow to a fluid outlet associated with the flow channel 60 in applications requiring distributed rates of fluid flow from a fluid outlet. The flow channel 60 provides an extended opening to entry 65 of fluid outlet 38 allowing more fluid to flow to entry 65 from pump cavity 50 along an approximate 90 degrees rotation of valve member 42. It should be noted that FIG. 4 illustrates the pump and valve 1 having only one flow channel 60 associated only with fluid outlet 38, a similar flow channel 60 can be molded into the pump housing 31 in an equivalent manner and associated with fluid outlet 39.

Figure 5:
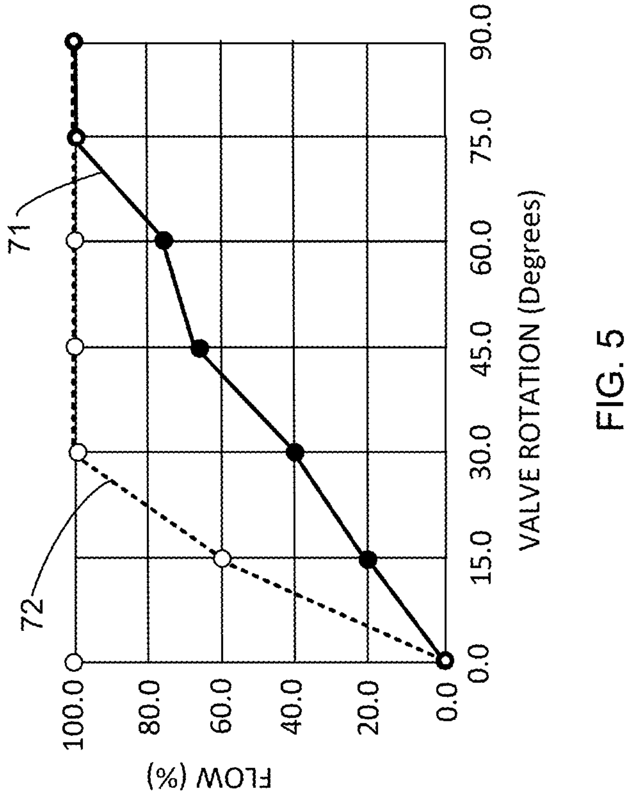
FIG. 5 is a graph comparing the flow of fluid from the fluid outlets of FIG. 4 in accordance with the present disclosure.

Table 2 below and FIG. 5 compares the fluid flow from a fluid outlet with and without a flow channel 60, Line 71 of FIG. 5 graphically illustrates the rates of flow from a fluid outlet with a flow channel 60 and line 72 the rates of flow without a fluid channel 60. Table 2 shows the percentage of the rates of flow from any fluid outlet with a flow channel 60, and any fluid outlet without a fluid channel 60. As can be seen in FIG. 5 and in Table 2, the flow channel 60 causes a greater distribution of fluid flow rates over a wider range of angular rotation of the valve member 42 than from a fluid outlet not having a flow channel 60.

TABLE 2

| Angle | Fluid Flow Without a Flow Channel (%) | Fluid Flow With a Flow Channel (%) |
|---|---|---|
| 0.0 | 0.0 | 0.0 |
| 15.0 | 60.0 | 20.0 |
| 30.0 | 100.0 | 40.0 |
| 45.0 | 100.0 | 67.0 |
| 60.0 | 100.0 | 75.0 |
| 75.0 | 100.0 | 100.0 |
| 90.0 | 100.0 | 100.0 |

Figures 6A, 6B, 6C:
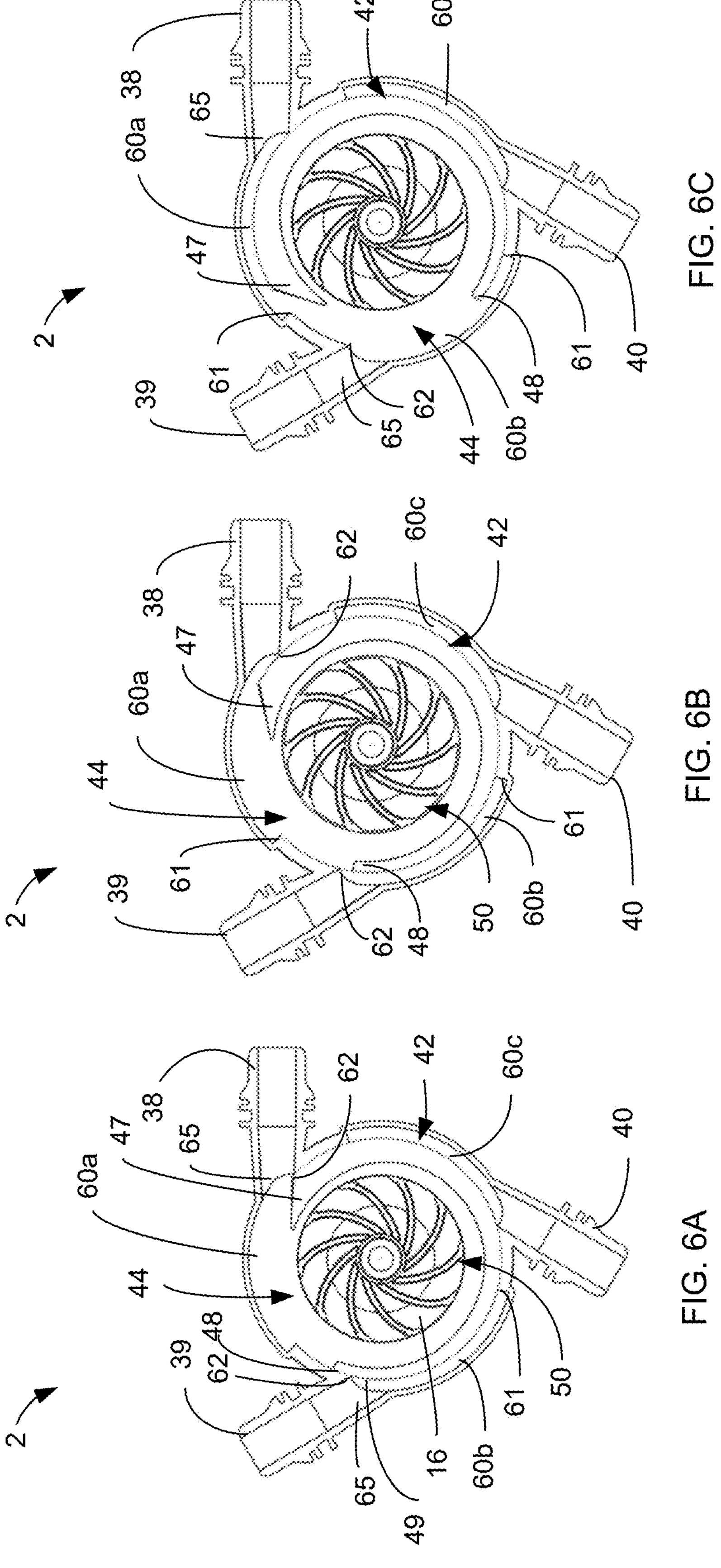
FIGS. 6A, 6B and 6C illustrates a cross-sectional view of a portion of the integrated pump and valve having three outlet ports in accordance with the present disclosure.

FIGS. 6A-6B illustrates schematically a pump and integrated valve 2, for an exemplary second embodiment of the present disclosure having three equally spaced fluid outlets 38, 39 and 40, all fluidically connected to the pump cavity 50. Each fluid outlet 38, 39 and 40 includes an associated flow channel 60*a*, 60*b* and 60*c*. As was explained above, the flow channel creates an expanded opening to the entry 65 of its associated fluid outlet 38, 39 and 40 that facilitates a greater distribution of fluid flow to the closing fluid outlet over a greater angle of the valve members 42 rotation. An example of the distribution of fluid flow rates from each fluid outlet 38 and 39 is shown below in Table 3. Table 3 shows the percentage of rates of fluid flow from flow outlet 38 and fluid outlet 39 over a 120-degree rotation of valve member 42. In this example, due to the use of three equally spaced fluid outlets and the diameter of the valve member 42, the valve member 42 rotates 120 degrees to provide a proportional distribution of output fluid flow rates from the two of the three fluid outlets for a 120-degree rotation of valve member 42. The third fluid outlet remains closed. The present disclosure will use stepped rotational angular movements of the valve member 42 by the actuator of approximately 15 degrees of angular rotation to explain the distributed fluid flow rates from the fluid outlets of the pump and integrated valve 2. It will be appreciated that the actuator may move the valve member at other stepped angles of rotation of less than or greater than 15 degrees, including for example, continuous rotational angular movements that may be provided by an analog servo actuator.

TABLE 3

| Angle | Fluid From Outlet 38 (%) | Fluid From Outlet 39 (%) |
|---|---|---|
| 0.0 | 100.0 | 0.0 |
| 15.0 | 78.0 | 22.0 |
| 30.0 | 42.0 | 58.0 |
| 45.0 | 33.0 | 67.0 |
| 60.0 | 25.0 | 75.0 |
| 75.0 | 19.0 | 81.0 |
| 90.0 | 0.0 | 100.0 |
| 105.0 | 0.0 | 100.0 |
| 120.0 | 0.0 | 100.0 |

It will also be appreciated that the valve member can be positioned by the actuator to control fluid flow between fluid outlet 40 and 38. For example, first end 47 may be positioned to allow 100% fluid flow from fluid outlet 40 and 0% from fluid outlet 38. During the 120-degree rotation of the valve member 42 between fluid outlet 40 and 38 fluid outlet 39 would remain closed. The rotation of valve member 42 rotates first end 47 clockwise reducing the fluid flow from fluid outlet 40 and increasing fluid flow from fluid outlet 38.

In FIG. 6A the valve member 42 is positioned by the actuator to have fluid outlet 38 open and fluid outlet 39 closed. At an angle of 0 degrees in this example, 100% of the fluid flow aligns opening 44 of valve member 42 with flow channel 60*a*. Fluid from pump cavity 50 is blocked from entering the flow channel 60*b*, due to exterior wall surface 49 seated against end wall 61. Second end 48 of opening 44 is seated against outlet wall 62, thereby closing off and obstructing fluid from entering flow channel 60*b*. Fluid outlet 40 remains closed over the 0 to a 120-degree transition of the valve member 42.

FIG. 6B illustrates schematically the valve member 42 rotated counterclockwise by 15 degrees of angular rotation. At the 15-degree angle of rotation opening 44 allows a distributed rate of fluid flow of approximately 78% of the fluid in pump cavity 50 to flow from fluid outlet 38 through fluid channel 60*a*. Second end 48 of opening 44 is unseated from outlet wall 62 but due to the reduced opening between second end 48 and outlet wall 62, only 22% of the fluid available from pump cavity 50 enters into flow channel 60*b* and to entry 65 of fluid outlet 39, thereby providing a proportional distributed rate of fluid flow between fluid outlets 38 and 39.

As the valve member 42 is rotated in subsequent 15-degree angles of rotation, the opening 44 of the valve member 42 causes the distance between end wall 61 and first end 47 to decrease, and the second end 48 and outlet wall 62 of fluid outlet 39 to increase, this causes a further proportional distribution of fluid flow between fluid outlets 38 and 39 due to the fluid flow into flow channel 60*b* being increased and the fluid flow into flow channel 60*a* being decreased.

FIG. 6C illustrates schematically the valve member 42 rotated 75 degrees from the 0-starting position at FIG. 6A. At 75 degrees of rotation, opening 44 is aligned with flow channel 60*b*. It does not receive all of the fluid in pump cavity 50 since an opening still exists to flow channel 60*a* between first end 47 and end wall 61. At the 75-degree angle, 81% of the fluid in the pump cavity 50 exits fluid outlet 39 and 19% from the fluid outlet 38.

At approximately 90-degrees of rotation of valve member 42 first end 47 of opening 44 seats against end wall 61 closing flow channel 60*a* from pump cavity 50. With flow channel 60*a* closed, 100% of the fluid in pump cavity 50 enters flow channel 60*b* via opening 44 and to flow from fluid outlet 39.

Figure 7:
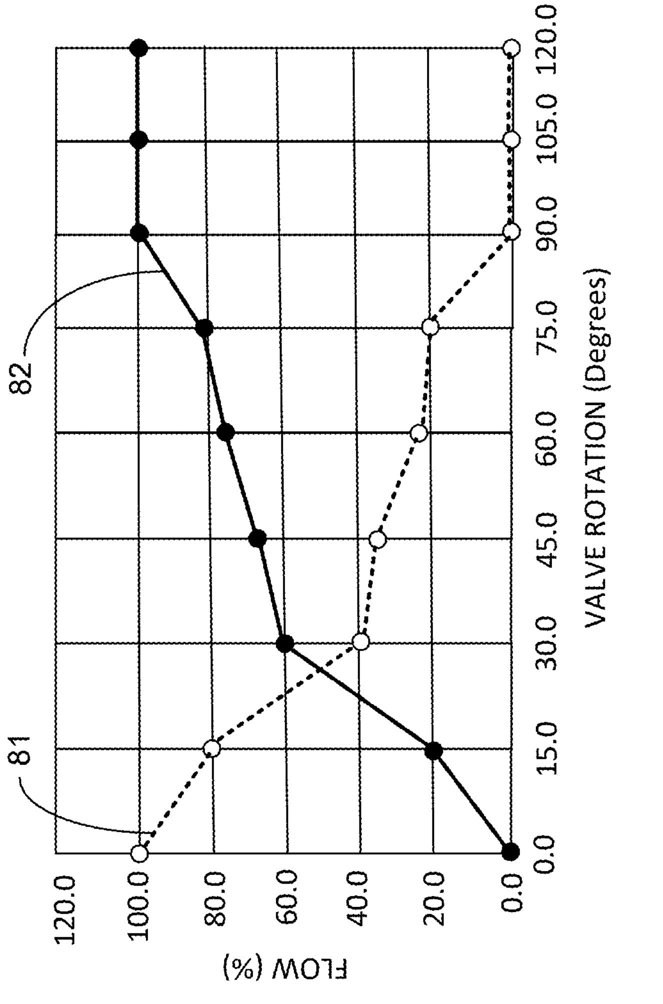
FIG. 7 is a graph illustrating the flow of fluid from the fluid outlets of FIGS. 6A, 6B and 6C in accordance with the present disclosure.

By adding a flow channel 60 to each fluid outlet of the integrated pump and valve 2 proportional distributed flow control from two or more fluid outlet of the pump and integrated valve can be realized. The proportional distributed rates of fluid flow from each fluid outlet 38 and 39 shown in Table 3 are graphically illustrated in FIG. 7. Line 81, of FIG. 7 graphs the rate of fluid flow from fluid outlet 38 and line 82 graphs the rate of fluid flow from fluid outlet 39.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A fluid pump comprising:

a housing having a fluid inlet and at least a first fluid outlet;

a cavity receiving the fluid from the fluid inlet;

a first flow channel connecting the cavity to the first fluid outlet;

an impeller located in the cavity for moving fluid from the cavity at a first rate of fluid flow;

a valve coupled to an actuator mounted between the impeller and the first flow channel, the valve having a valve annular wall with an opening extending through the valve annular wall fluidically connecting the cavity to the first flow channel and an interior surface that is spirally voluted from a thicker wall section at a first end of the opening to a thinner wall section at a second end of the opening, wherein responsive to the actuator, the valve is positionable to direct the fluid from the cavity at the first rate of fluid flow to enter the first flow channel through the opening and exit the first fluid outlet at a second rate of fluid flow.

2. The pump of claim 1, wherein the impeller is arranged to rotate inside the interior surface of the valve annular wall.

3. The pump of claim 1, wherein the first flow channel is located in the housing between an inner surface of the housing and a portion of an exterior surface of the valve annular wall proximate the first fluid outlet.

4. The pump of claim 3, wherein the first flow channel extends from an end wall to an outlet wall of the first fluid outlet.

5. The pump of claim 4, wherein the fluid in the cavity is blocked from entering the first flow channel when a wall portion of the valve annular wall at the first end of the opening is seated against the end wall.

6. The pump of claim 4, wherein the fluid from the cavity exits the first fluid outlet at the first rate of fluid flow when a wall portion of the valve annular wall at the first end of the valve opening is seated against the outlet wall of the first fluid outlet.

7. The pump of claim 4, wherein the second rate of fluid flow is altered by the distance that the first end of the valve opening is moved from the end wall.

8. The pump of claim 7, wherein the actuator is arranged to unseat a wall portion of the valve annular wall at the first end of the valve opening from the end wall and to selectively move the valve opening until the valve annular wall seats against the outlet wall.

9. The pump of claim 7, wherein the housing includes at least a second fluid outlet and at least a second flow channel, the second flow channel located in the housing between an inner surface of the housing and a portion of an exterior surface of the valve proximate the second fluid outlet.

10. The pump of claim 9, wherein the second flow channel extends from an end wall to an outlet wall of the second fluid outlet.

11. The pump of claim 10, wherein the fluid in the cavity is blocked from entering the second flow channel when a second wall portion of the valve annular wall at the second end of the opening is seated against the outlet wall of the second fluid outlet.

12. The pump of claim 11, wherein the fluid from the cavity enters the flow channel at the first rate of fluid flow when the second wall portion of the valve annular wall at the second end of the valve opening is seated against the end wall of the second fluid outlet.

13. The pump of claim 11, wherein the second rate of fluid flow is altered by the distance that the second end of the valve opening is moved from the outlet wall of the second fluid outlet.

14. The pump of claim 11, wherein the second rate of fluid flow from the first fluid outlet is proportional to the second rate of fluid flow from the second fluid outlet.

15. A method for producing a distributed rate of fluid flow from a fluid pump, the fluid pump having a fluid inlet and at least a first fluid outlet, the method comprising:

receiving a fluid into a cavity contained in the pump from the fluid inlet;

providing a first flow channel fluidically connecting the cavity to the first fluid outlet;

pumping the fluid from the cavity at a first rate of fluid flow; and selectively directing the fluid from the cavity into the first flow channel using a valve having a valve annular wall with an opening extending through the valve annular wall that fluidically connects the cavity to the first flow channel and an interior surface that is spirally voluted from a thicker wall section at a first end of the opening to a thinner wall section at a second end of the opening, the valve mounted between the impeller and the first flow channel and coupled to an actuator, wherein responsive to the actuator, the valve is movable to direct the fluid from the cavity at the first rate of fluid flow to enter the first flow channel through the opening and exit the first fluid outlet at a second rate of fluid flow.

16. The method of claim 15, wherein the pump further includes a second fluid outlet and a second flow channel fluidically connected to the pump cavity, wherein the valve is movable by the actuator to direct the fluid at the first rate of fluid flow to enter the second flow channel and exit the second fluid outlet at the second rate of fluid flow.

17. The method of claim 16, wherein the second rate of fluid flow from the first fluid outlet is proportional to the second rate of fluid flow from the second fluid outlet.

* * * * *